Figure 1:
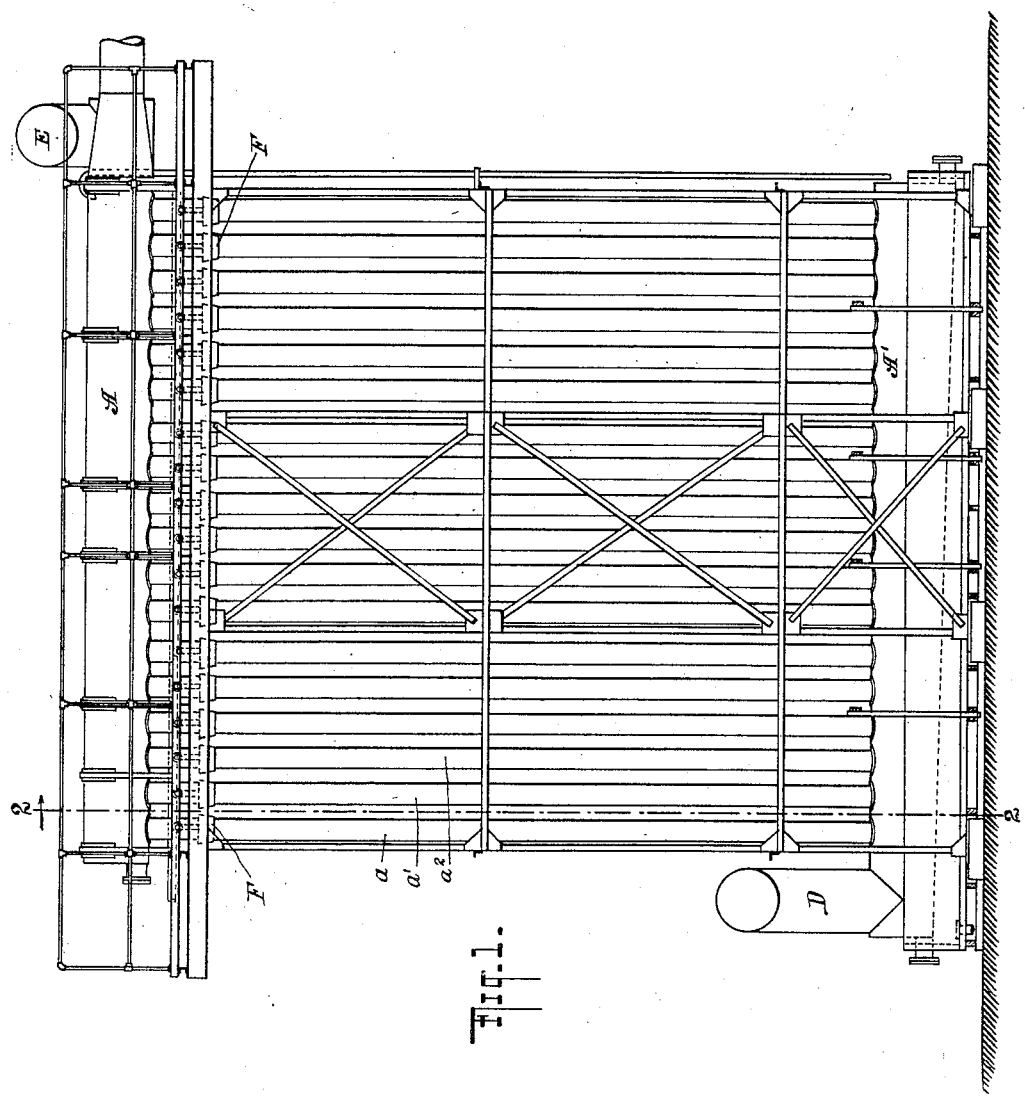

J. B. F. HERRESHOFF.
METHOD OF SEPARATING MOISTURE FROM BURNER GASES.
APPLICATION FILED FEB. 17, 1911.

1,113,437.

Patented Oct. 13, 1914.
3 SHEETS—SHEET 1.

WITNESSES:
G. V. Rasmussen

INVENTOR
JOHN B. F. HERRESHOFF
BY
ATTORNEYS

J. B. F. HERRESHOFF.
METHOD OF SEPARATING MOISTURE FROM BURNER GASES.
APPLICATION FILED FEB. 17, 1911.
1,113,437.
Patented Oct. 13, 1914.
3 SHEETS—SHEET 2.
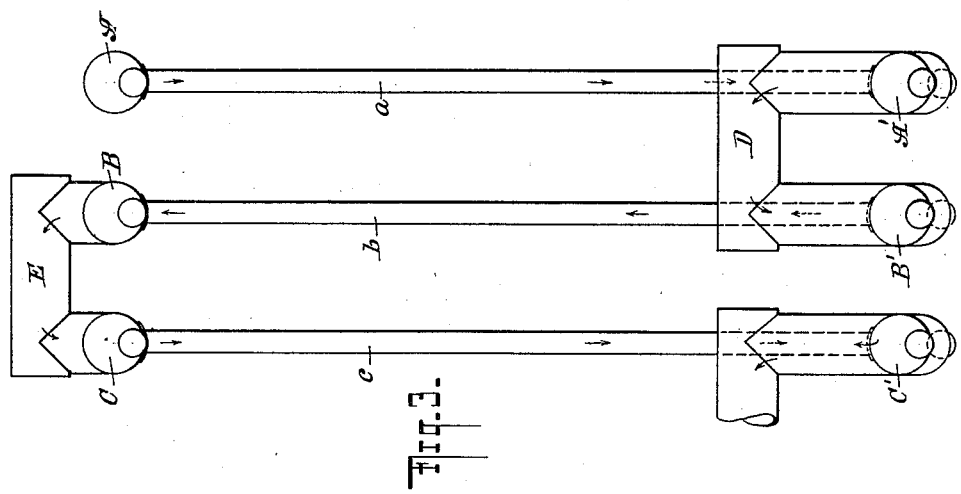
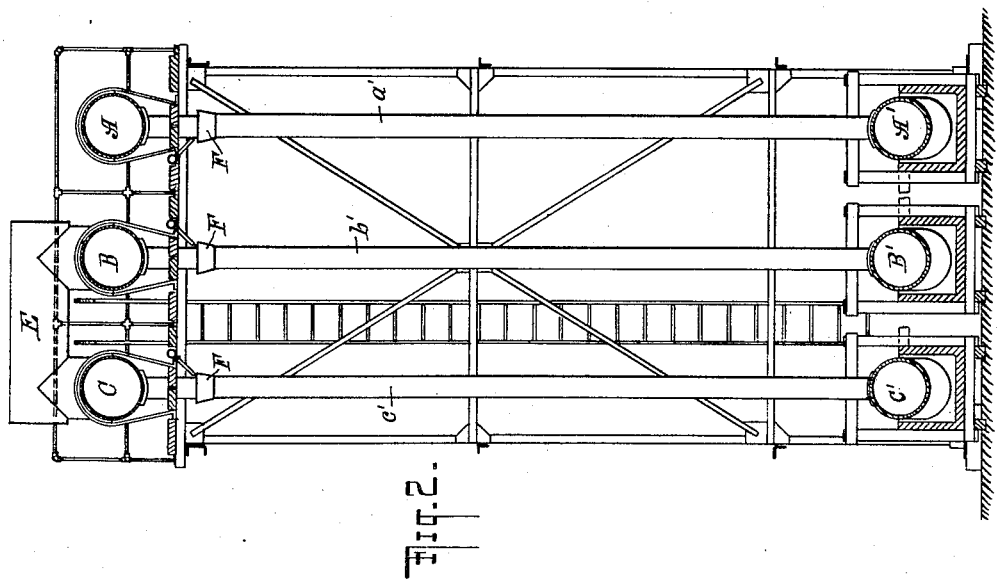
WITNESSES:
INVENTOR
JOHN B. F. HERRESHOFF
BY
ATTORNEYS J. B. F. HERRESHOFF.
METHOD OF SEPARATING MOISTURE FROM BURNER GASES.
APPLICATION FILED FEB. 17, 1911.
1,113,437.
Patented Oct. 13, 1914.
3 SHEETS—SHEET 3.
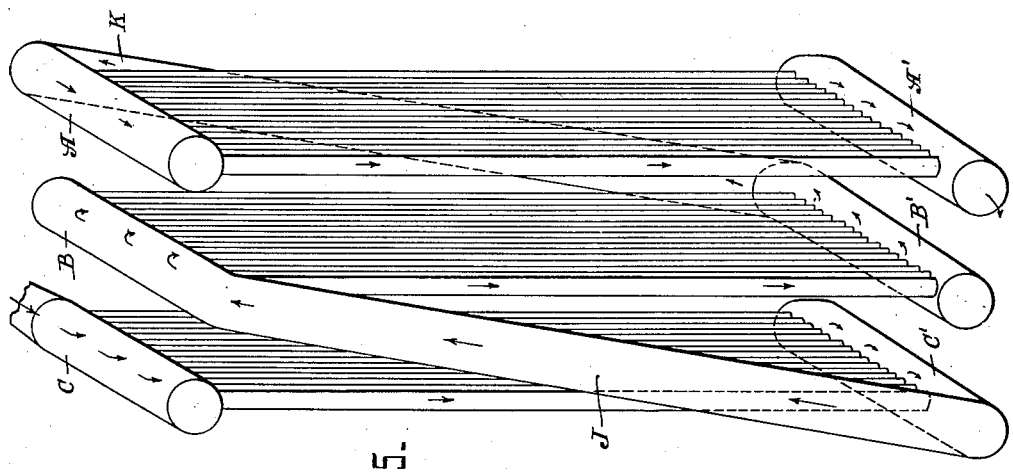
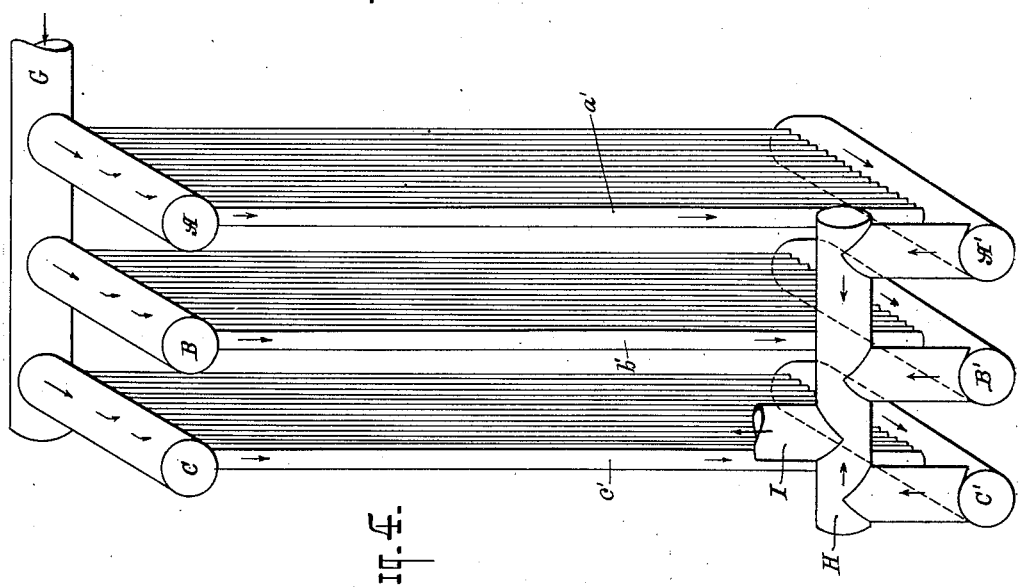
WITNESSES:
INVENTOR
JOHN B.F. HERRESHOFF
BY
ATTORNEYS

UNITED STATES PATENT OFFICE.

JOHN B. F. HERRESHOFF, OF NEW YORK, N. Y., ASSIGNOR TO GENERAL CHEMICAL COMPANY, OF NEW YORK, N. Y., A CORPORATION OF NEW YORK.

METHOD OF SEPARATING MOISTURE FROM BURNER-GASES.

1,113,437.      Specification of Letters Patent.      Patented Oct. 13, 1914.

Application filed February 17, 1911. Serial No. 609,175.

*To all whom it may concern:*

Be it known that I, JOHN B. F. HERRESHOFF, a citizen of the United States, and a resident of the borough of Manhattan, in the city, county, and State of New York, have invented a new and useful Improvement in Methods of Separating Moisture from Burner-Gases, of which the following is a specification.

My invention relates to a method of separating moisture from burner gases and has for its object to provide a method for such separation which shall be at once simple, economical and adapted to continuous operation.

My invention is based upon the following discovery which I have made, viz., that if hot burner gases which have been scrubbed with 40° Baumé sulfuric acid be rapidly cooled from about 200° Fahr. to about 100° Fahr., a considerable proportion of the contained water and water-vapor separates out as a liquid and this then contains but little of the sulfuric acid ($H_2SO_4$) or sulfuric anhydrid ($SO_3$) present in the burner gases; the amount of this separated sulfuric acid ($H_2SO_4$) is such that it usually makes up less than four (4) per cent. of the total liquid so separated out. In the summer time the temperatures may be from 40 to 50 degrees Fahrenheit higher than those just given.

This, my invention, is of particular value and utility in the manufacture of sulfuric anhydrid ($SO_3$) by the contact process from burner or other gases where cooling and washing of the gases in the course of their purification is effected by means of liquids such as sulfuric acid ($H_2SO_4$) of from 15° to 50° Baumé, or by water or by a combination of such means. As a type of such a process reference is made, for the purpose of illustration only, to the purification process described in my United States Patent #940,595, of November 16th, 1909. In this process the sulfuric acid mist condensing in the filter O, contains substantially all the moisture, evaporated from the scrubbing acid used in the scrubbing towers, E, E' and E² or elsewhere, previously introduced into the system.

The amount of evaporated moisture required to produce the necessary cooling effect in the burner gases prior to their entry into the filter O, is much in excess of that needed to combine with the sulfuric anhydrid ($SO_3$) or sulfuric acid ($H_2SO_4$) contained in the burner gases for their deposition in the filter O, and the result is that the strength or sulfuric acid ($H_2SO_4$) content of the liquid sulfuric acid deposited in the filter O, soon becomes such as to make it unavailable for any useful purpose except at an expense in excess of any gain thereby to be obtained.

By applying my invention at a point between the scrubbers E, E' and E² and the filter O, I effect a separation of so much of the contained moisture accompanied by so little sulfuric acid that the material so separated out can be thrown away without any substantial loss of useful or valuable material; the remainder of the contained sulfuric acid ($H_2SO_4$) and moisture travel on and the acid then separating out at the filter O, is of such strength that it can be used for feeding into the scrubbers E, E' and E² of said Patent 940,945 and for there producing the necessary temperature reduction. My new process is, therefore, substantially a process for the direct elimination of moisture as liquid water from the body of the gas and the so separated liquid water contains so little other material as to be for manufacturing purposes waste-water and the non-water component of the liquid bears such small proportion to the product of the manufacturing operation as a whole as to be practically negligible.

I have found that this process operates equally successfully with various kinds or grades of burner gases whether they be obtained from Spanish, Canadian or United States sulfur-bearing ores, such as pyrites or pyrrhotite.

In order to carry out this, my invention, I insert in the gas conduit a cooling device and at such point in the gas conduit where the temperature of the gas which has been scrubbed with 40° Baumé sulfuric acid is substantially 200° Fahr. This cooling device is to be so constructed that the temperature of the gas is reduced substantially 100° Fahr. in a 35 or 40 foot gas-travel or less. I have found the form of cooler shown in the drawings accompanying and below described, to answer this purpose very well, but my invention is not limited to use with this particular form of apparatus since other devices may be constructed to accomplish the same result.

In the drawings Figure 1 represents a side elevation of a three-part cooler suitable for carrying out my invention; Fig. 2 is a transverse section along the line 2—2 of Fig. 1; Fig. 3 is a diagrammatic view of the arrangement shown in Figs. 1 and 2; and Figs. 4 and 5 are diagrammatic views of two modifications of the cooler.

Referring to Figs. 1, 2, and 3 the cooler consists of three similar parts or sections each of which comprises an upper header as A, B, C supported above and parallel with a corresponding lower header as A', B', C', each pair of headers being connected together by a plurality of spaced parallel pipes as $a$, $a'$, $a^2$,—$b$, $b'$, $b^2$,—$c$, $c'$, $c^2$; each pipe $a$, $b$, $c$, etc., is provided with a usual water overflow cooler F. The front ends of lower headers A' and B', are connected together by a union D and the rear end of upper headers B and C by a similar union E. In the commercial example with which I have operated the upper and lower headers are placed about 25 feet to 30 feet apart and the diameter of each header is approximately 2 feet. There are 18 pipes $a$, $b$, $c$ each approximately 8 inches in diameter joining each pair of headers so that the combined cross sectional area of all the pipes of each section is about double that of one of the headers. The burner gases are brought into the cooler at the rear end of header A, pass through the pipes $a$ and out at the front end of header A', through union D to the front end of header B', then up through pipes $b$ to the rear end of header B, thence through union E to the rear end of header C and down through pipes $c$ to the front end of header C'; the arrows (Fig. 3) show this flow of gas. Since the distance from one end of any header to the other end of its corresponding header is the same for any of the pipes $a$, $b$, or $c$ belonging to the particular pair of headers considered the volume of gas flowing between the headers will also be the same for each pipe $a$, $b$, or $c$ of a given set.

I give below, for the purpose of illustration only, a specific instance of the operation of my invention; details may be varied and changed without departing from the scope thereof. For instance, if desired, the cooling of the burner gas by means of scrubbing can be dispensed with and the direct injection of water or sulfuric acid into the gases be substituted therefor and still a considerable proportion of the contained moisture can be so removed since the essential feature of my invention is the comparatively rapid cooling of the burner gas from about 250° or 200° Fahr. to 150° or 100° Fahr.

I start with a burner gas containing about 7% by volume of sulfur dioxid ($SO_2$) and produced by the roasting of, for example, a Spanish pyrite and passing it through suitable conduits until its temperature has been reduced to 900° Fahr., and then into a scrubbing tower where the gas is scrubbed with a sufficient amount of sulfuric acid of, say, 50° Bé., so that the temperature of the gas is reduced to 200° or 250° Fahr. This gas is now passed into the cooling device just described where its temperature is reduced about 100° Fahr., i. e., to 100° or 150° Fahr., at the exit end of the cooling device. Under these conditions about one-third of the moisture contained in the gas entering the cooling device is separated out as a liquid containing only a few per cent. of sulfuric acid (say, 3% or 4%) and dissolved gases such as air and sulfur dioxid and with little or no suspended solid matter. The sulfuric acid now separating out further along in the cooling and purifying system will be of a strength so that it can be used for the cooling of other portions of burner gases.

Fig. 4 shows the application of my invention to another form of cooler in which the three cooling sections are arranged in parallel instead of in series as in Figs. 1 to 3, all the upper headers A, B, C being joined at their rear to a main supply pipe G and all the lower headers A', B', C' being joined at their front to a similar gas outlet pipe 4 from which the gas passes onward through a pipe I.

Fig. 5 shows still another modification embodying a structure similar to that shown in Figs. 1 to 3 the cooling sections being in series but the course of the burner gases being down through the first section, then up to the top of the second section through a connecting pipe J, then down through the second section and up to the top of the third section through a pipe K and finally down through the third section and out.

In the claims following I employ the expression "moisture in a liquid state" to embrace not only pure water but water containing dissolved in it such matters as sulfuric acid ($H_2SO_4$) or sulfurous acid ($H_2SO_3$), or water containing amounts of suspended matter in amounts less than such as produce a paste with the water itself. I also use the term "pretreated burner gases" to mean gases which have undergone a scrubbing or equivalent treatment with water or with sulfuric acid or their equivalent or equivalents.

My invention can also be applied to scrubbed burner gases prior to their entry into a dust removing device such as a dust settling chamber.

I claim as my invention:

1. The process of separating moisture in a liquid state from pretreated burner gases, which consists in cooling said burner gases from 200° Fahr. to 100° Fahr. and removing the so-condensed liquid.

2. The process of separating moisture in a liquid state from pretreated burner gases, which consists in rapidly cooling said burner gases from 200° Fahr. to 100° Fahr. and removing the so-condensed liquid.

In testimony whereof I have hereunto set my hand in the presence of two subscribing witnesses.

JOHN B. F. HERRESHOFF.

Witnesses:
   HENRY WOGGLESWORTH,
   ELMER G. WILLYOUNG.